United States Patent
Kodnani et al.

(10) Patent No.: US 6,639,638 B1
(45) Date of Patent: Oct. 28, 2003

(54) LCD COVER OPTICAL STRUCTURE AND METHOD

(75) Inventors: Ramesh R. Kodnani, Binghamton, NY (US); Mark V. Pierson, Binghamton, NY (US); William J. Rudik, Vestal, NY (US); David B. Stone, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,501

(22) Filed: Aug. 27, 1999

(51) Int. Cl.[7] .............................................. G02F 1/1335
(52) U.S. Cl. ........................ 349/110; 349/122; 349/112; 349/73
(58) Field of Search ..................... 349/58, 110, 112, 349/96, 73, 122, 187; 430/5, 7, 20, 25

(56) References Cited

U.S. PATENT DOCUMENTS

| | | | |
|---|---|---|---|
| 3,840,695 A | * | 10/1974 | Fischer ..................... 257/350 |
| 4,515,440 A | | 5/1985 | Mosier |
| 5,132,830 A | * | 7/1992 | Fukutani et al. ............ 349/106 |
| 5,338,240 A | | 8/1994 | Kim |
| 5,400,157 A | | 3/1995 | Won |
| 5,563,470 A | | 10/1996 | Li |
| 5,611,941 A | | 3/1997 | Booth |
| 5,661,531 A | | 8/1997 | Greene et al. |
| 5,668,569 A | | 9/1997 | Greene et al. |
| 5,739,880 A | | 4/1998 | Suzuki et al. |
| 5,780,201 A | | 7/1998 | Sabnis et al. |
| 5,781,258 A | | 7/1998 | Dabral et al. |
| 5,796,452 A | | 8/1998 | Pierson |
| 5,805,117 A | | 9/1998 | Mazurek et al. |
| 5,903,328 A | * | 5/1999 | Greene et al. ............... 156/106 |
| 6,396,634 B1 | * | 5/2002 | Ishikawa et al. ............... 349/64 |

FOREIGN PATENT DOCUMENTS

EP           532311 A1      9/1992

* cited by examiner

*Primary Examiner*—Robert H. Kim
*Assistant Examiner*—Tai Duong
(74) *Attorney, Agent, or Firm*—Elizabeth W. Cook; C. Lamont Whitham; Arthur J. Samodovitz

(57) ABSTRACT

A large liquid crystal display optical structure can be created by providing a transparent substrate with a dark mesh pattern disposed thereon. A means for optical scattering is over, adjacent, or surrounding the dark mesh, with a polarizer laminated to a smooth surface of the means for optical scattering.

12 Claims, 1 Drawing Sheet

LCD COVER OPTICAL STRUCTURE AND METHOD

BACKGROUND OF THE INVENTION

1. Field of the Invention

The present invention generally relates to the construction of liquid crystal displays (LCD) and more specifically, methods of tiling in constructing large LCDs.

2. Background Description

Large LCD displays are in demand. Costs to manufacture the larger displays are very high because of handling damage, poor yields, and the requirements for retooling LCD factories for size and capacity. LCD tiling is being used to keep costs down and eliminate the need for factory retooling; however, improvements in tiling methods are needed.

SUMMARY OF THE INVENTION

It is therefore an object of the present invention to provide a large liquid crystal display having an optical scattering means with voidless conditions.

This invention pertains to one of the special technical requirements for tiling. In a tiled display, two or more tiles are sandwiched between two larger transparent (such as glass or plastic) substrates referred to as the cover plate (top) and the back plate (bottom). Alternatively, tiles, may be laminated or attached on a large substrate, coverplate (on top). To keep the display "seamless" a dark color, preferably black, mesh pattern is placed on the top transparent substrate to hide the tiling seams and circuit path wiring. Any dark color may be appropriate for the mesh including brown, blue, and green. Along with the mesh, optical scattering is needed to widen the viewing angle on the display so several people can view it at once, much like a projection screen. A plastic polarizer is attached to these surfaces. It has been discovered that entrapped air will adversely affect the optical characteristics, and should be avoided. This invention provides a voidless surface for the polarizer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
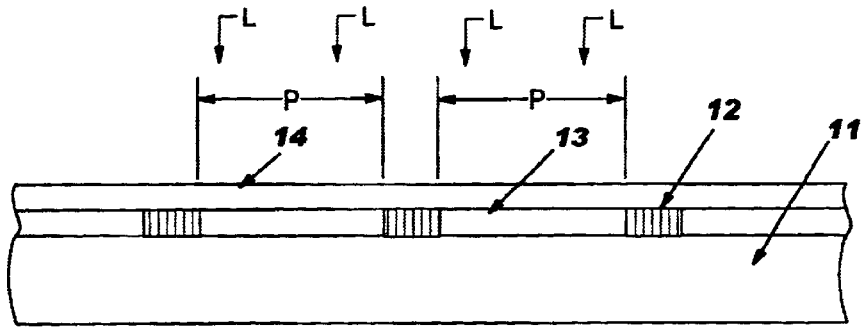
FIG. 1 is a cross section of a first embodiment of the present invention, in which a liquid optical scattering material is cured in the dark mesh pattern on the surface of the transparent substrate.

Referring now to the drawings, and more particularly to FIG. 1, there is shown a cross section of the top transparent substrate 11. A black mesh 12, such as PSR 4000 epoxy based black solder mask made by Taiyo Co., Carson City, Nev., is used for making the dark mesh pattern on the transparent substrate. Polymeric materials like black photo imageable epoxy or polyimide can also be used to make the dark mesh. The optical scattering material 13 is coated an cured in the dark mesh pattern on the transparent substrate. The scattering material may include Da-Lite Screen Co., Inc., Warsaw, Ind. "video vision screen", or "DA-WA screen". These screens are made of glass particles in a polymer suspension (e.g. fine crushed glass particles in an epoxy). The scattering material is filled in between the black mesh (preferably 0.002" thick) by a screening process. The optical scattering material 13 is filled in as a liquid and then cured. Adding the optical scattering material 13 as a liquid allows a smooth surface to be created for the polarizer 14. The polarizer 14 is preferably adhesively attached. Air voids are eliminated because, in liquid form, the optical scattering material 13 fills in any voids that may be created by the black mesh 12, and, after curing the surface of the scattering material to which the polarizer 14 is laminated is flat. The pixel elements P in the tile are aligned with the openings between the black mesh. Light L is generated from the back of the display thru the pixel P and projected on the optical scattering material 13.

Figure 2:
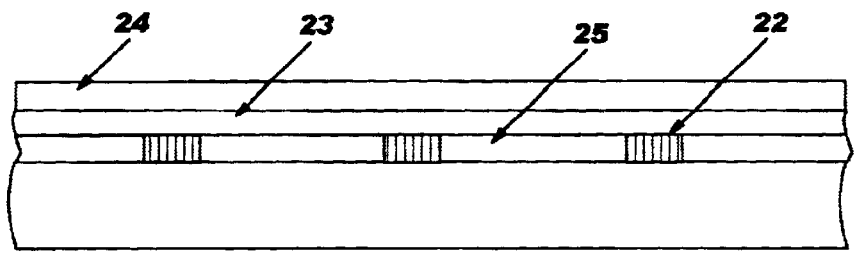
FIG. 2 is a cross section showing a second embodiment, in which an optically clear adhesive is added between a black mesh pattern.

In FIG. 2 another embodiment the inventive optical structure is constructed with an optically clear adhesive 25 added between openings in the black mesh pattern 22. The optically clear adhesive 25 should have a refractive index matching that of the transparent substrate (e.g. the RI of glass is approximately 1.52). Materials which meet this requirement for glass include silicone (Sylgard #182 and #184 by Dow Corning Corp. Midland, Mich.; Dow Corning Silicone Adhesive #6646 by Dow Corning Corp. Midland, Mich.), epoxy (Epo-Tek #310 by Epoxy Technology Inc., Bellerica Mass., Masterbond #37-3 by Masterbond, Inc. Lake in the Hills, Ill.) and acrylics (Ablestik #4083 and #4031 by Ablestik Laboratories, Rancho Dominguez, Calif.). Other materials, optical adhesives, which have refractive index closely matching glass are also acceptable for use with this invention. The optical scattering material 23 is coated on the optical adhesive 25 and the black mesh 22 to form a flat surface with which to bond the polarizer 24, thereby limiting void formation.

Figure 3:
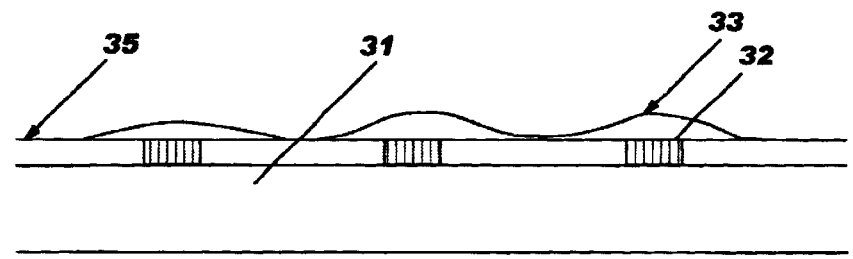
FIG. 3 is a cross section showing a third embodiment, in which optical scattering material is laminated to a black mesh pattern and the surface of the substrate.

A third embodiment is shown in FIG. 3 in which the optical scattering material 33, such as a solvent based liquid adhesive with glass particles is coated on black mesh 32. In this embodiment, the optical scattering material is in a solid form which is laminated to the substrate surface 31 and over the black mesh 32. The optical scattering material may be a solvent based liquid adhesive with glass particles. In this process, small voids or bubbles may be created at the edges of the junction between the black mesh 32 and the substrate 31. If the polarizer (not shown) were laminated to the "wavy" surface created by laminating optical scattering material 33 over the unsmooth surface of black mesh 32 and substrate 31, massive air voids would be created. For this reason, prior to laminating the polarizer (not shown), the optical scattering material is ground to the height 35 of the black mesh 32 to create a smooth surface onto which the polarizer is laminated.

Figure 4:
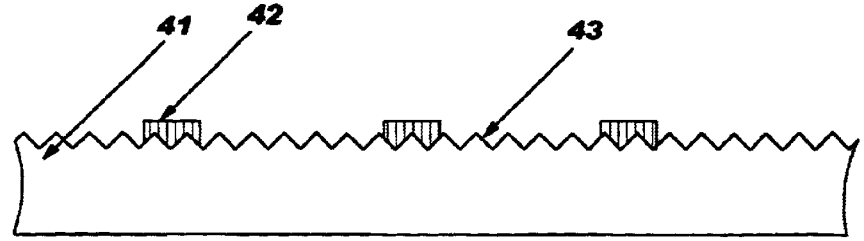
FIG. 4 is a cross section showing a fourth embodiment in which optical scattering is provided by etching one side of the transparent substrate.

Yet another embodiment is shown in FIG. 4. For this structure no optical scattering material needs to be added. In this embodiment, the optical scattering is caused by etching or frosting the surface of the substrate 41. One side 43 of the transparent substrate is either sand blasted or chemically etched to provide optical scattering. The black mesh 42 could be plated or screened and developed on the substrate to keep the standoff thin and eliminate voiding when the polarizer (not shown) is added. Alternately, the space between the black mesh may be filled with clear adhesive (not shown) as shown in FIG. 2 and then the polarizer added to the smooth surface created by the black mesh and clear adhesive. Also, a frosted texture could be added to the surface by sand or vapor blasting or chemical etching.

While the invention has been described in terms of its preferred embodiments, those skilled in the art will recognize that the invention can be practiced with modification within the spirit and scope of the appended claims.

We claim:

1. A method for forming a liquid crystal display (LCD) composite from a plurality of LCD tiles, said method comprising the steps of:
    roughening a surface of a transparent substrate to provide optical scattering of light emitted from said LCD tiles through said substrate;
    plating or screening a mesh on said roughened external surface or cover seams between said LCD tiles;
    filling in holes within said mesh with an optically clear material to form a substantially flat surface; and
    forming a polarizing layer on said substantially flat surface.

2. A method for forming the liquid crystal display composite as in claim 1 wherein the steps are performed in the order listed.

3. A method for forming a liquid crystal display composite as in claim 1, wherein said roughening step is performed by frosting said surface of said transparent substrate.

4. A method for forming a liquid crystal display composite as in claim 1, wherein said roughening step is performed by etching said surface of said transparent substrate.

5. A method of making a liquid crystal display composite comprising the steps of:
    applying a dark mesh to a transparent substrate;
    filling openings within said dark mesh with an optical scattering material by screening to avoid substantially covering said dark mesh with said scattering material and thereby forming a substantially flat surface from said dark mesh and said scattering material, said scattering material being substantially flush with a surface of said dark mesh opposite said transparent substrate; and
    placing a polarizer over said dark mesh and said optical scattering material.

6. A method of making a liquid crystal display composite as in claim 5 wherein said filling step including the steps of:
    depositing said optical scattering material between openings in said dark mesh; and
    curing said optical scattering material.

7. A method of making a liquid crystal display structure comprising the steps of:
    applying a dark mesh to a transparent substrate;
    filling openings in said dark mesh with an optical scattering material; and
    placing a polarizer over said dark mesh and said optical scattering material; and wherein said filling step includes the steps of:
    laminating said optical scattering material over said dark mesh; and
    leveling said optical scattering material to a height equivalent to said dark mesh material.

8. A method of making a liquid crystal display comprising the steps of:
    applying a dark mesh to a transparent substrate;
    adding a transparent material to said surface of said transparent substrate between openings in said dark mesh;
    positioning an optical scattering material over said dark mesh; and
    applying a polarizer over said optical scattering material.

9. A liquid crystal display (LCD) composite comprising:
    a transparent substrate;
    a dark mesh distributed on a surface of said transparent substrate to cover seams between LCD tiles of said LCD composite;
    an optical scattering material on said transparent substrate filling holes in said dark mesh forming a substantially flat surface opposite said transparent substrate; and
    a polarizer layer on said substantially flat surface; and
    wherein a surface of said optical scattering material is substantially flush with said mesh to form said substantially flat surface.

10. A liquid crystal display structure comprising:
    a transparent substrate;
    a dark mesh distributed on a surface of said transparent substrate;
    a means for optical scattering positioned adjacent said dark mesh;
    a polarizer positioned on said means for optical scattering; and
    an optically clear adhesive on said substrate surface positioned between said dark mesh, which has a height equal to said dark mesh and wherein said optically scattering means comprises an optically scattering material having bottom surface adjacent a top surface of said dark mesh and said optically clear adhesive.

11. A liquid crystal display structure as in claim 10 wherein said optically scattering material is laminated over and between said dark mesh and said polarizer is laminated to a flattened surface of said optically scattering material.

12. A liquid crystal display (LCD) composite comprising:
    a plurality of LCD tiles arranged in a two dimensional array;
    a transparent substrate having a roughened external surface to optically scatter light emitted from said LCD tiles through said substrate;
    a mesh material on said roughened external surface to cover seams between said LCD tiles;
    an optically clear material within said mesh to form a substantially flat surface; and
    a polarizing layer on said said substantially flat surface.

* * * * *